(12) United States Patent
Driesen (10) Patent No.: US 9,501,516 B2
(45) Date of Patent: Nov. 22, 2016

(54) ZERO DOWNTIME UPGRADE OF DATABASE APPLICATIONS USING TRIGGERS AND CALCULATED FIELDS

(71) Applicant: Volker Driesen, Heidelberg (DE)

(72) Inventor: Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/576,558

(22) Filed: Dec. 19, 2014

(65) Prior Publication Data

US 2016/0179497 A1    Jun. 23, 2016

(51) Int. Cl.
| | | |
|---|---|---|
| G06F 9/44 | (2006.01) | |
| G06F 17/30 | (2006.01) | |
| G06F 9/445 | (2006.01) | |

(52) U.S. Cl.
CPC .......... G06F 17/30377 (2013.01); G06F 8/65 (2013.01)

(58) Field of Classification Search
CPC ................. G06F 8/60–8/751; G06F 17/30377
USPC ..................................... 717/169; 707/609–831
See application file for complete search history.

(56) References Cited

U.S. PATENT DOCUMENTS

| | | | |
|---|---|---|---|
| 6,304,882 B1 | 10/2001 | Strellis et al. | |
| 6,367,077 B1* | 4/2002 | Brodersen ................. | G06F 8/65 707/E17.032 |
| 6,385,626 B1* | 5/2002 | Tamer .................. | G06F 11/1451 |
| 6,711,593 B1* | 3/2004 | Gordon ............. | G06F 17/30377 707/615 |
| 7,035,943 B2* | 4/2006 | Yamane .............. | G06F 11/0709 707/E17.032 |
| 7,523,142 B2 | 4/2009 | Driesen et al. | |
| 7,818,740 B2* | 10/2010 | Bankston ................... | G06F 8/65 707/638 |
| 8,200,634 B2* | 6/2012 | Driesen ..................... | G06F 8/65 707/610 |
| 8,229,579 B2 | 7/2012 | Eldridge et al. | |
| 8,356,010 B2* | 1/2013 | Driesen ................. | G06F 17/303 707/610 |
| 8,370,828 B2* | 2/2013 | Bankston .................. | G06F 8/65 707/638 |
| 8,380,667 B2* | 2/2013 | Driesen ............. | G06F 17/30297 707/610 |

(Continued)

OTHER PUBLICATIONS

Oracle® Database—JDBC Developer's Guide—12c Release 1 (12.1-)—Jun. 2014.*

*Primary Examiner* — Francisco Aponte
(74) *Attorney, Agent, or Firm* — Mintz Levin Cohn Ferris Glovsky and Popeo, P.C.

(57) ABSTRACT

An upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. Subsequently, concurrent access is provided for each access schema to at least one database table in the data schema to the first and second versions of the database application. The concurrent access is enabled by a respective at least one table link object in each of the first access schema and the second access schema that is used by database views or stored procedures such access schema.

16 Claims, 6 Drawing Sheets

(56) References Cited

U.S. PATENT DOCUMENTS

| | | | |
|---|---|---|---|
| 8,412,689 B2* | 4/2013 | Reid | G06F 9/466 707/703 |
| 8,417,737 B2* | 4/2013 | Hopmann | G06F 17/30297 707/803 |
| 8,521,706 B2* | 8/2013 | Alpern | G06F 17/30306 707/695 |
| 8,819,050 B2* | 8/2014 | Babka | G06F 17/30309 707/765 |
| 8,909,610 B2* | 12/2014 | Reid | G06F 9/466 707/703 |
| 9,092,474 B2* | 7/2015 | Bentzien | G06F 17/30359 |
| 9,152,659 B2* | 10/2015 | Cline | G06F 17/303 |
| 9,213,728 B2* | 12/2015 | Engelko | G06F 17/30309 |
| 2002/0178077 A1 | 11/2002 | Katz et al. | |
| 2004/0015953 A1 | 1/2004 | Vincent | |
| 2005/0138013 A1* | 6/2005 | Walker | G06F 17/3048 |
| 2005/0251523 A1 | 11/2005 | Rajamani et al. | |
| 2008/0098046 A1 | 4/2008 | Alpern et al. | |
| 2008/0115134 A1* | 5/2008 | Elliott | G06F 9/4856 718/101 |
| 2009/0019094 A1 | 1/2009 | Lashley et al. | |
| 2010/0088281 A1 | 4/2010 | Driesen et al. | |
| 2010/0153341 A1* | 6/2010 | Driesen | G06F 17/303 707/661 |
| 2010/0162226 A1* | 6/2010 | Borissov | G06F 8/67 717/173 |
| 2010/0223430 A1* | 9/2010 | Walker | G06F 17/3048 711/126 |
| 2011/0016461 A1* | 1/2011 | Bankston | G06F 8/65 717/170 |
| 2011/0246419 A1 | 10/2011 | Yancey et al. | |
| 2013/0138695 A1* | 5/2013 | Stanev | G06F 17/30309 707/792 |
| 2013/0238555 A1 | 9/2013 | Driesen et al. | |
| 2013/0238577 A1* | 9/2013 | Driesen | G06F 17/30578 707/695 |
| 2013/0238868 A1 | 9/2013 | Driesen et al. | |
| 2014/0101644 A1* | 4/2014 | Buzaski | G06F 17/30174 717/168 |
| 2014/0101650 A1* | 4/2014 | Buzaski | G06F 17/30174 717/170 |
| 2014/0114913 A1* | 4/2014 | Engelko | G06F 17/30079 707/609 |
| 2014/0143284 A1* | 5/2014 | McCaffrey | G06F 17/30297 707/803 |
| 2014/0164425 A1* | 6/2014 | Gruenhagen | G06F 17/30424 707/769 |
| 2014/0258343 A1* | 9/2014 | Nikula | G06F 17/30315 707/803 |
| 2015/0074140 A1* | 3/2015 | Hutzel | G06F 17/30979 707/769 |
| 2016/0070751 A1* | 3/2016 | Clifford | G06F 17/30554 707/722 |
| 2016/0085777 A1* | 3/2016 | Engelko | G06F 17/30292 707/803 |

\* cited by examiner

ZERO DOWNTIME UPGRADE OF DATABASE APPLICATIONS USING TRIGGERS AND CALCULATED FIELDS

TECHNICAL FIELD

The subject matter described herein relates to the use of triggers and calculated fields in connection with the zero downtime upgrade of database applications.

BACKGROUND

Deployment of maintenance packages to computing platforms often require downtime of such platforms. At the beginning of downtime, a backup is created and this backup serves as a fallback option, in case the upgrade fails. Advancements in technology have enabled for reduced, and in some cases, minimal downtime upgrades. With such arrangements, upgrades run in parallel to a production system within the same database for the complete duration of the upgrade. The upgrade procedure creates clones of the tables, which are changed by the upgrade and runs database triggers to replicate data from production to the upgrade copy of the tables.

SUMMARY

An upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, concurrent access is provided for each access schema to at least one database table in the data schema to both the first version of the database application and the second version of the database application. The concurrent access is enabled by a respective at least one table link object in each of the first access schema and the second access schema that is used by database views or stored procedures such access schema.

The at least one database table in the data schema can be updated, using at least one application trigger associated with at least one table link object, to reflect changes in the corresponding table link object. There can be a first application trigger in the first access schema on the first table link and a second application trigger in the second access schema on a second table link. In some implementations, only the first trigger is called if the table in the data schema is updated through the first table link object in the first access schema and only the second trigger is called if the table in the data schema is updated through the second table link object in the second access schema.

The at least one table link can specify a select field list of the at least one table in the data schema such that the list of fields specified by the table link object is smaller than the list of fields of the table.

The at least one table link object can be used by a database object that cannot use a database view.

At least one of the table link object can specify a calculated field. The calculated field can be transient. The at least one table link object can reference a table in the data schema that specifies a calculated field. In such cases, the calculated field can be persisted.

The database application can be executed using an in-memory database system such a columnar/column oriented in-memory database system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, with the current subject matter, new software is deployed in parallel to old software while, at the same time, as much persistency as possible is reused. Such an arrangement provides an in-place upgrade in which, if the upgrade writes to persistency, either due to content delivery or due to data migration activities, the data for the respective database tables is duplicated. This approach minimizes the additional memory consumption during the upgrade procedure as compared to conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter enables revocation of zero downtime upgrades by providing a procedure on the same level as the upgrade deploy tool, which executes steps, revoking actions of the initial deployment on a database table level. Various types of zero downtime maintenance/upgrade procedures can be utilized such as that described in U.S. Pat. App. Pub. No. 20130238555 entitled: "Aliases for accessing shared tables during provision of continuous access during application upgrade" and in U.S. Pat. App. Pub. No. 20130238868 "Using temporary system to provide continuous access during application upgrade", the contents of both of which are hereby fully incorporated by reference. As will be described in further detail below, if a table is populated during the upgrade, the upgrade procedure creates a copy of the table, installs a database trigger to replicate all changes done by production from the production table to the upgrade's copy. At the end of the upgrade, the access of production is switched to the target table. For the revoke procedure, the copy of the table created for the upgrade can be dropped and usage can remain with the original table. Similar approaches can be defined for all other table categories.

Figure 1:
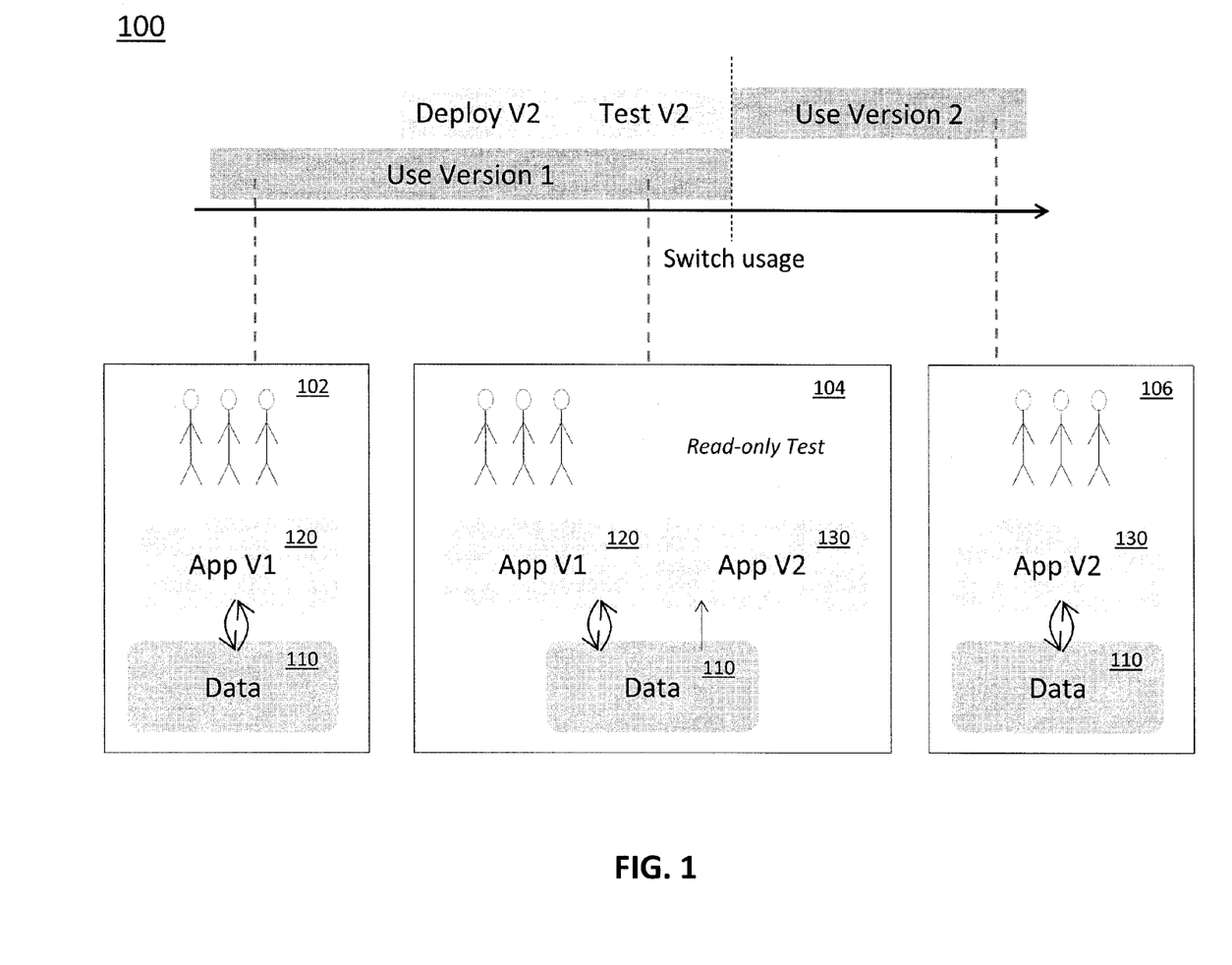
FIG. 1 is a process flow diagram illustrating phases of a zero downtime upgrade.

FIG. 1 is a diagram 100 illustrating an approach to deploy an upgrade across three separate phases 102, 104, 106 with zero downtime. Initially, in the first phase, an application version 1 (V1) 120 as part of its operations performs read and writes on a database 110. Thereafter, in a subsequent phase 104, a second version of the application (application V2 13) is deployed and tested. During such testing, the interaction of application V2 130 with the database 110 can be limited to read only testing (as opposed to being able to perform both read and write operations on the database 110). Once the testing of application V2 130 has been completed, a switchover can be performed, in phase 106, in which application V2 130 is the sole application interacting (via read and write operations) on the database 110. In some cases, the switchover can be accomplished with zero downtime (i.e., there is always one application executing on the database 110).

Figure 2:
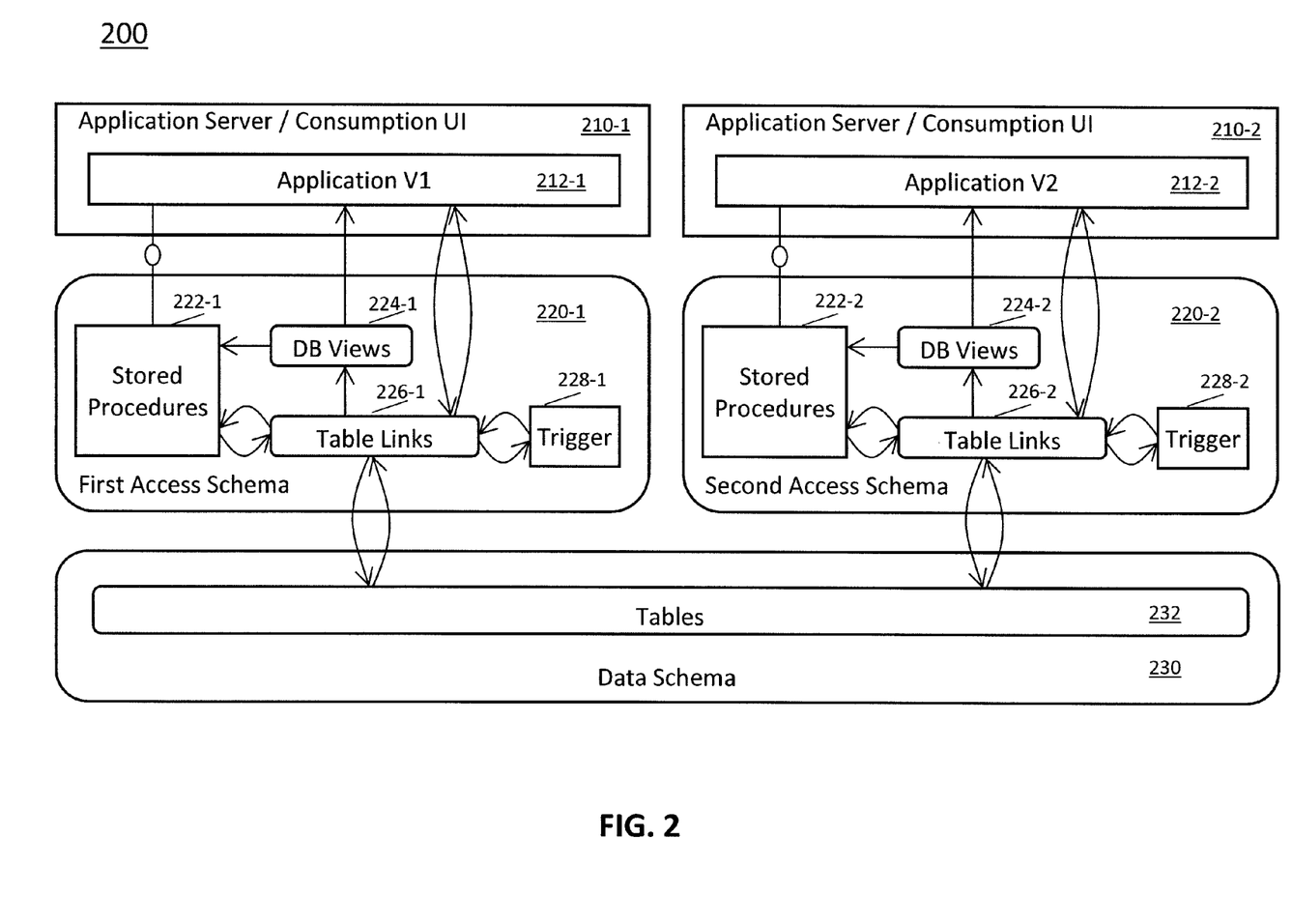
FIG. 2 is a system diagram illustrating a zero downtime upgrade using table links.

With reference to diagram 200 of FIG. 2, the general idea of an in-place upgrade procedure is to deploy the software twice, while, at the same time, keeping the main part of the data in a single representation. The only data that can be held in two representations is that data which is changed by the upgrade—either due to content deployment or due to structure changes of the database tables (duplicates are not needed for new fields).

Two versions of application software 212-1 and 212-2 can be accessed, for example, on a client via a respective application server/consumption user interface (on a client device) 210-1, 210-2. In order to main data mainly as a singleton (i.e., a single representation), while being able to deploy the software twice (via application version 1 212-1 and application version 2 210-2), the deployed software (application V1 212-1 and application V2 212-2) can access underlying data in tables 232 in a data schema 230 (or in some cases multiple data schemas) by using different database access schemas 220-1, 220-2. Within some database systems (e.g., an in-memory database such as the HANA platform offered by SAP SE), not only can database tables be used, but also database views 224-1, 224-2, stored procedures 222-1, 222-2 (subroutines available to applications that access a relational database system, etc.), scripts and the like. All of these elements can be created in an access schema 220-1, 220-2 which can, as an analogy, acts as a proxy/interface to the underlying data stored in the tables 232 in the data schema 230. The data stored in tables 232 can be stored in the data schema 230 and can be published to the respective access schema 220-1, 220-2 holding the application code and views via a table link 226-1, 226-2 (as described in further detail below). The database views 224-1, 224-2 are results sets of stored queries on the data in the tables 232 which the server/users 210-1, 210-2 can query just as they would in a persistent database collection object.

During an upgrade, a second access schema 220-2 is created. Then, the tables 232 can be exposed to this second access schema 220-2 via a new table link 226-2, the views 224-2 can be created and the software for application V2 212-2 can be deployed. During deployment of the new application V2 212-2, the tables 232 can be set to read only access for the second access schema 220-2. If the database tables 232 need to be written to or structurally changed by the upgrade, the database tables 232 can be copied and the copy can be exposed to the second access schema 220-2 under its original name.

The table link 226-1, 226-2 can be a database objet type that is either standalone or it can be an attribute for an existing database view or database synonym/alias. The table links 226-1, 226-2 can be created in each access schema 220-1, 220-2 and can be consumed by some or all database objects in the access schema such as calculation views, analytical views, stored procedures, database triggers, database built in functions (e.g., calculation engine functions, etc.) like unit conversion or quantity conversion or calendar functions and other objects.

The table links 226-1, 226-2 can each act like a view to the database tables 232 allowing only "to select" operations from one table (while omitting data fields and not omitting key fields). There can be different types of table links 226-1, 226-2, for example, there can be a table link type for row tables and one for column tables. The name of the table links 226-1, 226-2 and the names of the table can differ. In order to allow adding new fields to a table without needing to clone it, a field list can be defined which can be exposed by the table link 226-1, 226-2 such that only data fields can be omitted. If an update happens to the table link 226-1, 226-2 and a data field is not available in the table link but in the table, the field in the table shall be updated with a database default value for the field. In other words, the table links 226-1, 226-2 can be characterized as synonyms with the option to specify the selected fields as in a view.

Updates to the table links 226-1, 226-2 by the applications 212-1, 212-2 can cause the table links 226-1, 226-2 to update the database table 232. In addition, the table links 226-1, 226-2 can fill fields in the database table 232 that are not referenced with default values. Select for update on the table links 226-1, 226-2 can be executed on the table 232 so that entries there are locked.

The table links 226-1, 226-2 can additionally allow for the definition of triggers 228-1, 228-2 (when associated with table links they are referred to herein as application triggers). The application triggers 228-1, 228-2 associated with the table links 226-1, 226-2 can be objects encapsulating procedural code that can be automatically executed in response to certain events on the table links 226-1, 226-2. The table links 226-1, 226-2 can also allow for the generation of calculated fields (as will be described in more detail below).

As part of a zero downtime upgrade, application triggers 228-1, 228-2 can be created on the table link 226-1, 226-2 in the respective access schema 220-1, 220-2 instead of creating them on the database tables 232 in the data schema 230. The application triggers 228-1, 228-2 can act to only fire for updates for the table links 226-1, 226-2 in the access schema 220-1, 220-2 in which it was created. Further, in some cases, an application trigger 228-1, 228-2 can be created for the table link 226-1, 226-2 and a database trigger 304 (see diagram 300 of FIG. 3) for tables 232, 302.

Application triggers 228-1, 228-2 have to be created in the access schema 220-1, 220-2, as this way, they can be updated to a new version easily and the application triggers 228-1, 228-2 can call stored procedures 222-1, 222-2 in the corresponding schema 220-1, 220-2 and access all other database objects locally in the schema 220-1, 220-2.

During the upgrade, two application triggers 228-1, 228-2 can be deployed: the application version 1 trigger 228-2 is active in the first access schema 220-1 and the application version 2 trigger 228-1 is active in the second access schema 228-2. If an update is done in the first access schema 220-1 on the table link 226-1, the application trigger 228-1 in the first access schema 220-1 shall fire, but not the trigger in the second access schema 220-2 and vice versa.

Figure 3:
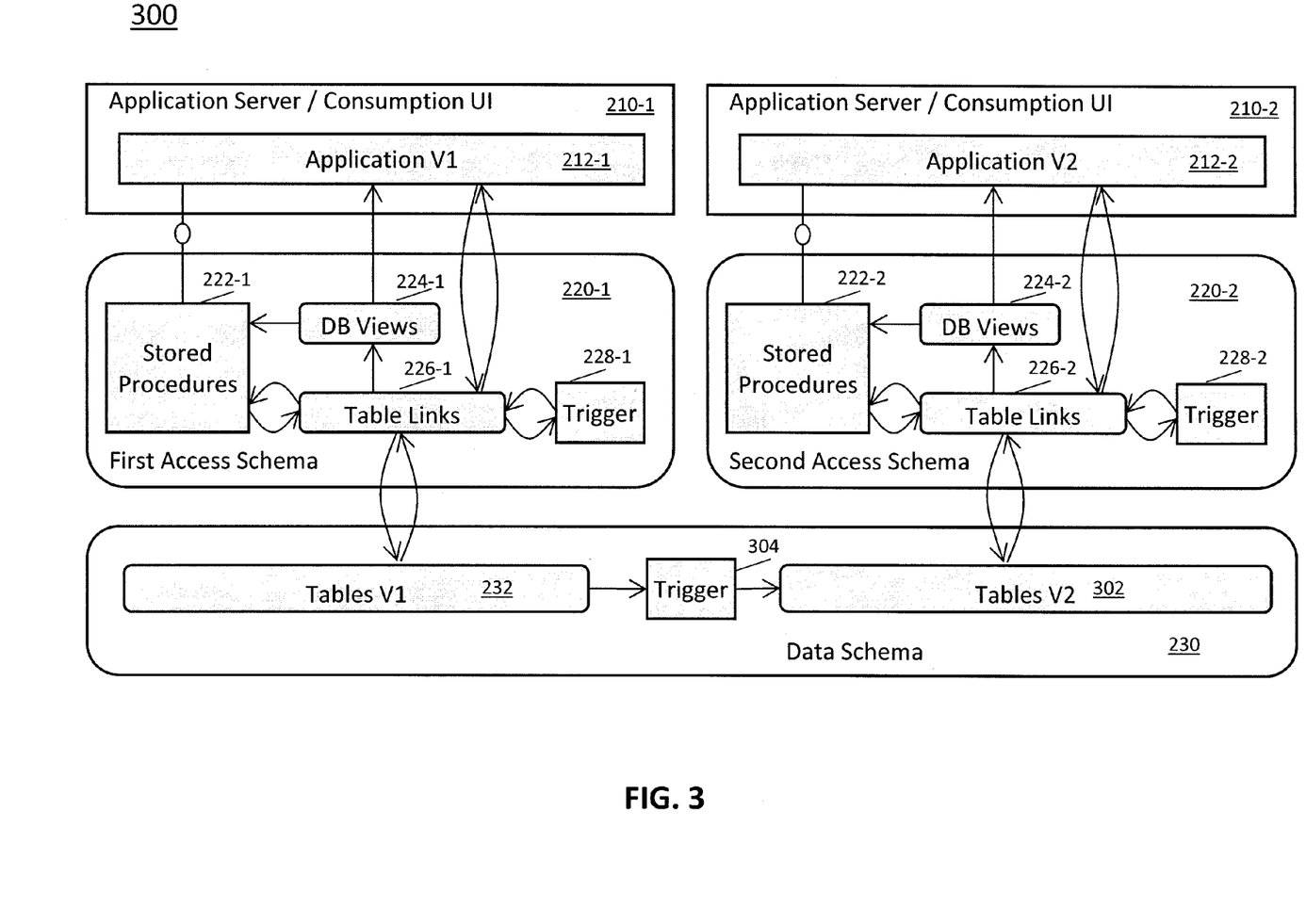
FIG. 3 is a system diagram illustrating a zero downtime upgrade using table links and cloned tables.

In this scenario, the upgrade procedure may also define triggers 304 in the data schema 230 on the database tables to populate new fields. During an upgrade, there can potentially be a clone of the table (so that there are tables V1 232 and tables V2 302). The clone process can be done with a database trigger 304. In this arrangement, there can be application triggers 228-1, 228-2 in the access schemas 220-1, 220-2 defined by the application and database triggers 304 in the data schema 230 defined by the upgrade procedure. These database triggers 304 can execute the updates done to the original table (table V1 232) also on the copy table (table V2 302).

In this case (as illustrated in diagram 300 of FIG. 3), an update to table link 226-1 in the first access schema 220-1, can trigger the corresponding application trigger 228-1 as well as the database trigger 304 in the data schema 230.

Still further, calculated fields can be provided. For example, with reference to diagram 400 of FIG. 4, transient calculated fields 402-1, 402-2 can be defined in the access schemas 220-1, 220-1. In addition, as described below in connection with diagram 500 of FIG. 5, persisted calculated fields 502 can be defined in the data schema 230.

Figure 4:
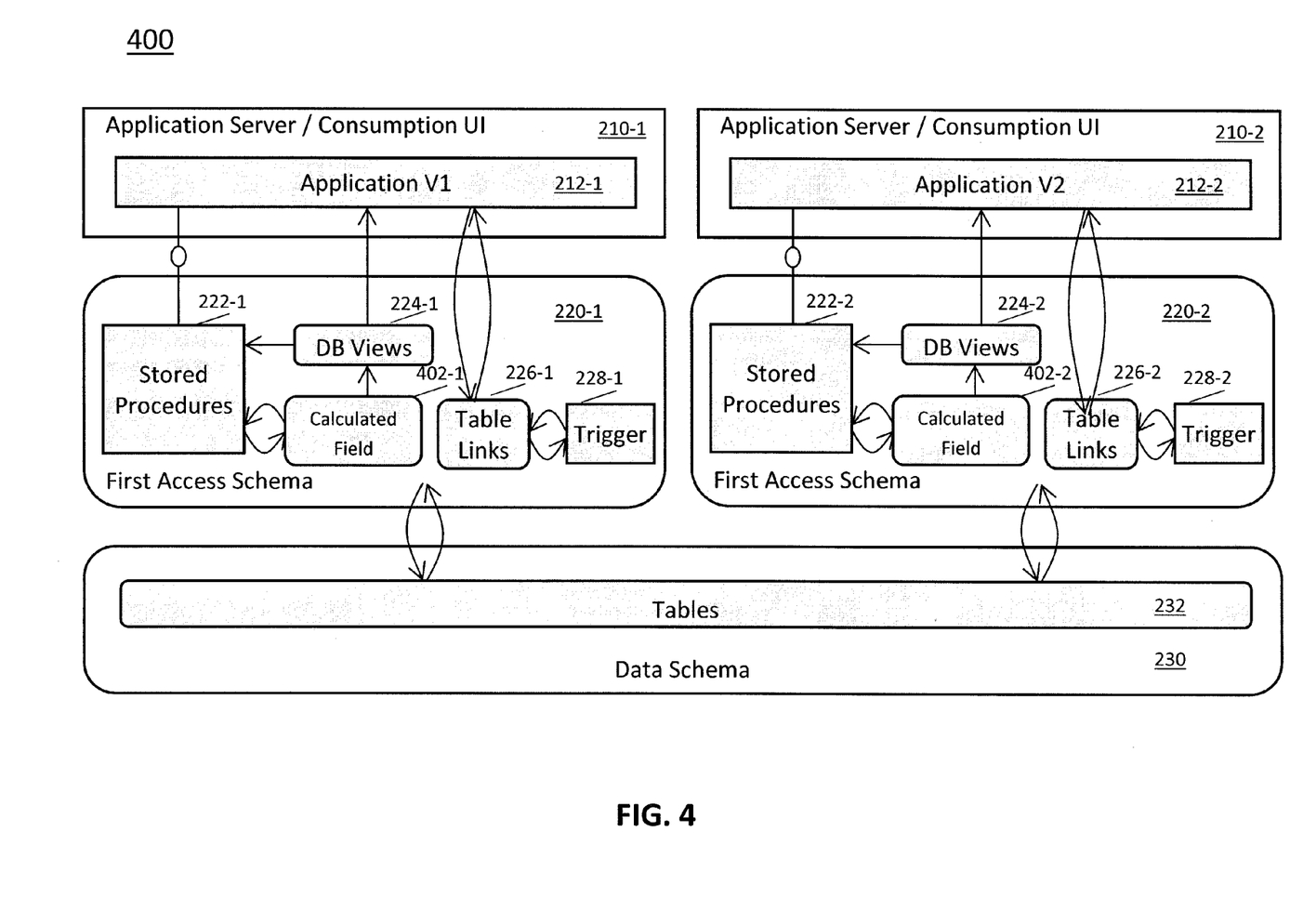
FIG. 4 is a system diagram illustrating a zero downtime upgrade using table links and transient calculated fields.

A transient calculated field 402-1, 402-2 is not persisted in the database tables 232. The values for the calculated field 402-1, 402-2 can be computed upon select. With the current subject matter, a transient calculated field 402-1, 402-2 can be defined only on the corresponding table links 226-1, 226-2, not on the tables 323 in the data schema 230. This arrangement allows for the changing of calculated field logic in a new software release without the need to copy the complete table 232. Further, this approach can also enable the calculated field 402-1, 402-2 to call custom code deployed as a stored procedure.

Figure 5:
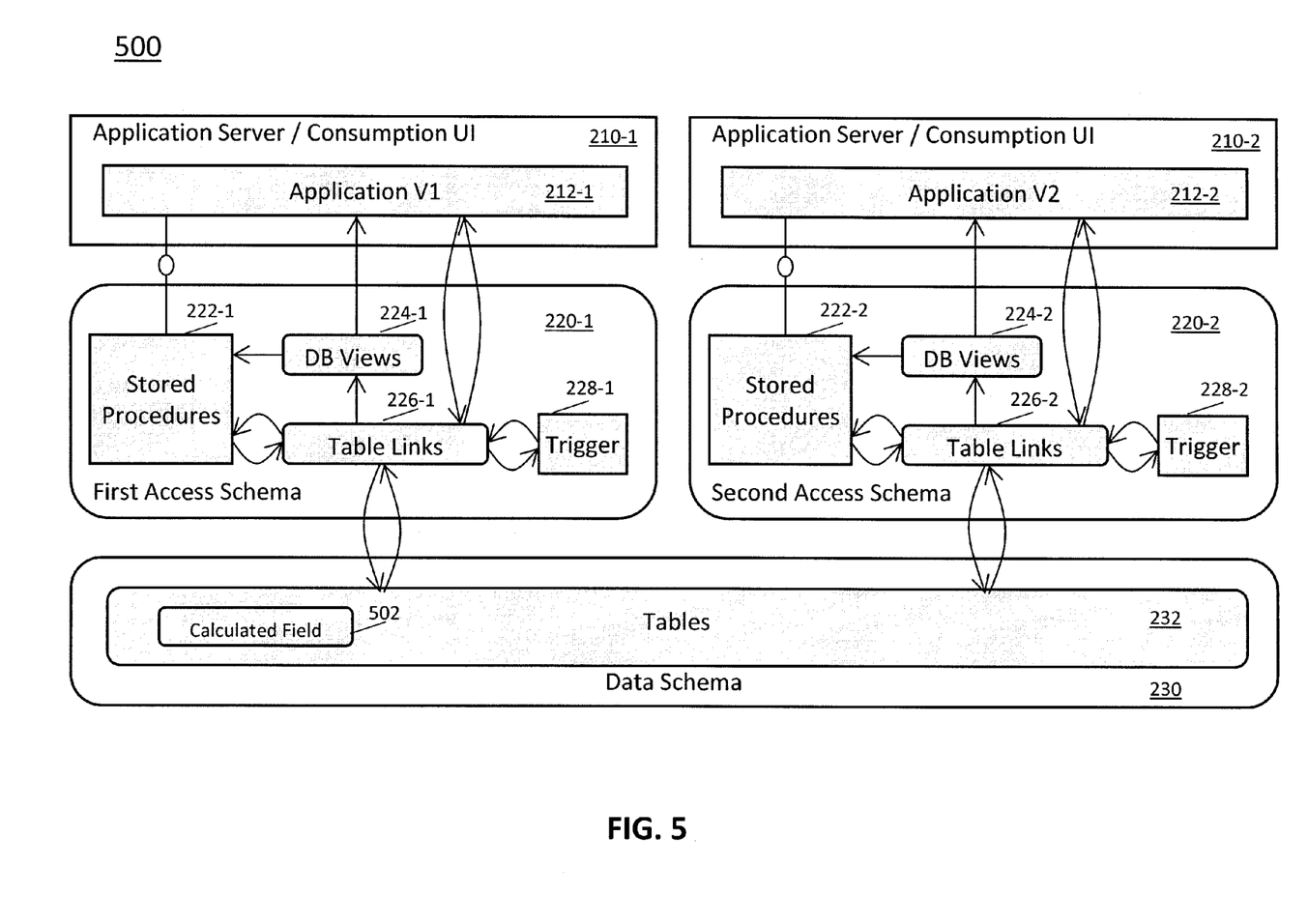
FIG. 5 is a system diagram illustrating a zero downtime upgrade using table links and persisted calculated fields.

If the field is persisted, the situation is different. The calculated field 502 (i.e., field value) can be stored in the data schema 230. This can be defined by the statement "GENERATED ALWAYS AS <expression>" in the database table create statement. The expression to create the field value may in this case not call external database code as such code can only be deployed once (in the data schema 230).

If such a persisted calculated field 502 is changed—a new expression can be defined and delivered with the upgrade—the database table 232 needs to be cloned to create the new field with the content computed along the new statement in a cloned table 302. In this case, the database trigger 304 may not write to the calculated field 502 but, rather, the table logic can compute the field content.

Figure 6:
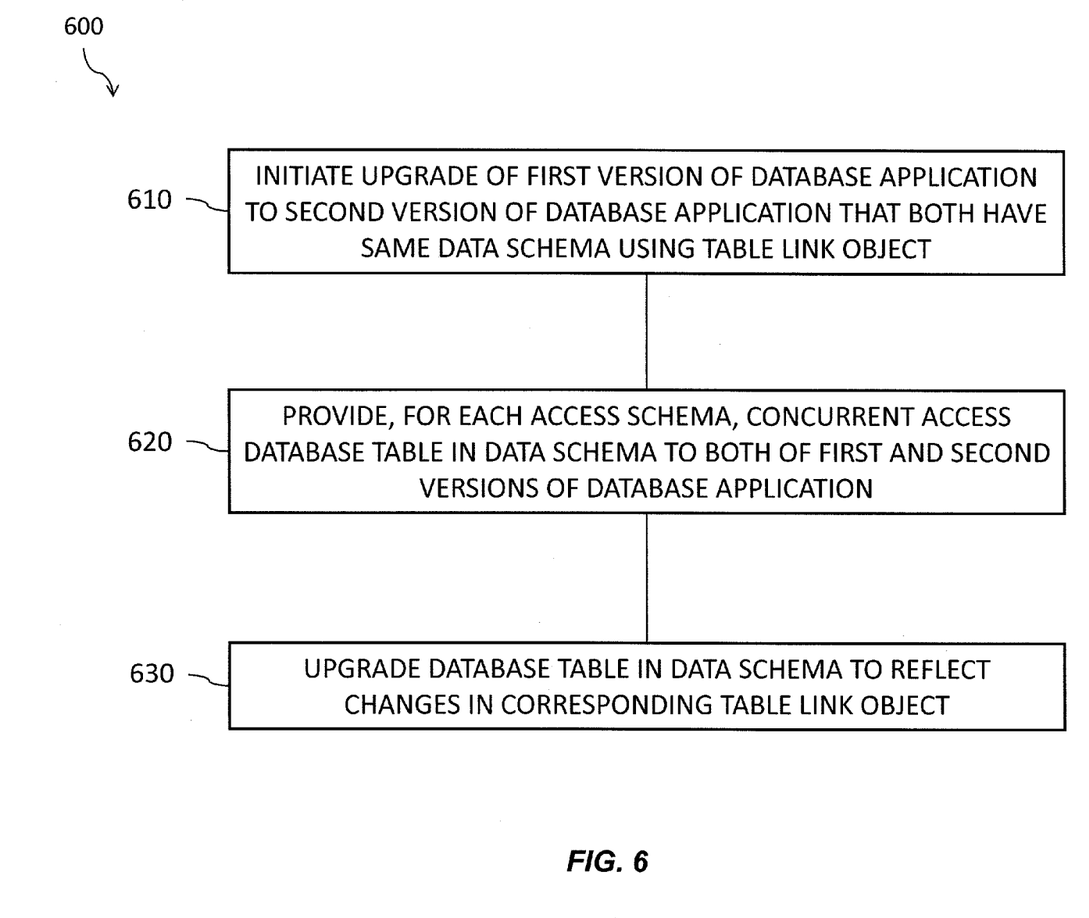
FIG. 6 is a process flow diagram illustrating a process for zero downtime upgrade of database applications using triggers.

FIG. 6 is a process flow diagram 600 in which, at 610, an upgrade of a first version of a database application to a second version of a database application that both have a same data schema is initiated. The first database application has a first access schema such that at least one table in the data schema is linked to the first access schema. The second version of the database application has a second access schema such that at least one table in the data schema is linked to the second access schema. The first access schema differs from the second access schema. Subsequently, at 620, concurrent access is provided for each access schema to at least one database table in the data schema to both the first version of the database application and the second version of the database application. The concurrent access is enabled by a respective at least one table link object in each of the first access schema and the second access schema that is used by database views or stored procedures such access schema. Further, optionally, at 630, the at least one database table in the data schema is updated, using at least one application trigger associated with at least one table link object, to reflect changes in the corresponding table link object.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device, the method comprising:

initiating an upgrade of a first version of a database application to a second version of the database application that both have a same data schema, the first version of the database application having a first access schema comprising a first table link object linking to a database table in the data schema to the first access schema, the first table link object specifying a transient calculated field that is not persisted in the database table in the data schema, the transient calculated field being defined on the first table link object and not on the database table in the data schema such that changing of calculated field logic for the transient calculated field in the upgrade proceeds without requiring copying of the database table; and creating a second access schema for the second version of the database application, the second access schema comprising a second table link object linking the database table in the data schema to the second access schema, the first access schema differing from the second access schema, the first access schema and the second access schema providing concurrent access to the database table in the data schema to the first version of the database application via the first access schema and to the second version of the database application via the second access schema, the first table link object being consumable by one or more first database objects in the first access schema and acting as a first view to the database table in the data schema, and the second table link object being consumable by one or more second database objects in the second access schema and acting as a second view to the database table in the data schema.

2. The method of claim 1, wherein the first table link object specifies a select field list of the database table in the data schema, wherein the select field list specified by the table link object is smaller than a list of fields of the database table.

3. The method of claim 1, wherein the first table link object is used by a database object that cannot use a database view.

4. The method of claim 1, wherein the first table link object references a table in the data schema that specifies a calculated field.

5. The method of claim 4, wherein the calculated field is persisted.

6. The method of claim 1, wherein the database application is executed using an in-memory database system.

7. The method of claim 1, further comprising: deploying a first application trigger active in the first access schema and a second application trigger active in the second access schema, the first application trigger being associated with the first table link object and the second application trigger being associated with the second table link object.

8. The method of claim 7, further comprising: firing the first application trigger only when the first table link object is updated and the second application trigger only when the second table link object is updated, the firing of the first application trigger causing the first table link object to update the database table to add a new field without cloning the database table in the data schema.

9. A non-transitory computer program product storing instructions which, when executed by at least one hardware data processors, result in operations comprising:

initiating an upgrade of a first version of a database application to a second version of the database application that both have a same data schema, the first version of the database application having a first access schema comprising a first table link object linking to a database table in the data schema to the first access schema, the first table link object specifying a transient calculated field that is not persisted in the database table in the data schema, the transient calculated field being defined on the first table link object and not on the database table in the data schema such that changing of calculated field logic for the transient calculated field in the upgrade proceeds without requiring copying of the database table; and creating a second access schema for the second version of the database application, the second access schema comprising a second table link object linking the database table in the data schema to the second access schema, the first access schema differing from the second access schema, the first access schema and the second access schema providing concurrent access to the database table in the data schema to the first version of the database application via the first access schema and to the second version of the database application via the second access schema, the first table link object being consumable by one or more first database objects in the first access schema and acting as a first view to the database table in the data schema, and the second table link object being consumable by one or more second database objects in the second access schema and acting as a second view to the database table in the data schema.

10. The computer program product of claim 9, wherein the first table link object specifies a select field list of the database table in the data schema, wherein the select field list specified by the table link object is smaller than a list of fields of the database table.

11. The computer program product of claim 9, wherein the first table link object is used by a database object that cannot use a database view.

12. The computer program product of claim 9, wherein the first table link object references a table in the data schema that specifies a calculated field.

13. The computer program product of claim 12, wherein the calculated field is persisted.

14. The non-transitory computer program product of claim 9, wherein the operations further comprise: deploying a first application trigger active in the first access schema and a second application trigger active in the second access schema, the first application trigger being associated with the first table link object and the second application trigger being associated with the second table link object.

15. The non-transitory computer program product of claim 14, wherein the operations further comprise: firing the first application trigger only when the first table link object is updated and the second application trigger only when the second table link object is updated, the firing of the first application trigger causing the first table link object to update the database table to add a new field without cloning the database table in the data schema.

16. A system comprising:
at least one hardware data processor; and
memory storing instructions which, when executed by the at least one data processor, result in operations comprising:
initiating an upgrade of a first version of a database application to a second version of the database application that both have a same data schema, the first version of the database application having a first access schema comprising a first table link object linking to a database table in the data schema to the first access schema, the first table link object specifying a transient calculated field that is not persisted in the database table in the data schema, the transient calculated field being defined on the first table link object and not on the database table in the data schema such that changing of calculated field logic for the transient calculated field in the upgrade proceeds without requiring copying of the database table; and
creating a second access schema for the second version of the database application, the second access schema comprising a second table link object linking the database table in the data schema to the second access schema, the first access schema differing from the second access schema, the first access schema and the second access schema providing concurrent access to the database table in the data schema to the first version of the database application via the first access schema and to the second version of the database application via the second access schema, the first table link object being consumable by one or more first database objects in the first access schema and acting as a first view to the database table in the data schema, and the second table link object being consumable by one or more second database objects in the second access schema and acting as a second view to the database table in the data schema.

\* \* \* \* \*